United States Patent [19]

McCambridge et al.

[11] Patent Number: 5,657,050
[45] Date of Patent: Aug. 12, 1997

[54] DISTANCE CONTROL FOR DISPLAYING A CURSOR

[75] Inventors: Lora K. McCambridge, Redmond; John P. Pennock, Bellevue; Kenneth Ray Robertson, Redmond, all of Wash.

[73] Assignee: Microsoft Corporation, Redmond, Wash.

[21] Appl. No.: 591,979

[22] Filed: Jan. 30, 1996

[51] Int. Cl.[6] ............................................ G09G 3/02
[52] U.S. Cl. ............................... 345/145; 395/339
[58] Field of Search .............................. 345/145, 157, 345/158; 395/155, 157, 159, 161, 339

[56] References Cited

U.S. PATENT DOCUMENTS

| | | | |
|---|---|---|---|
| 4,586,035 | 4/1986 | Baker et al. | 345/157 |
| 4,984,152 | 1/1991 | Muller | 395/153 |
| 5,146,211 | 9/1992 | Adams et al. | 345/145 |
| 5,146,212 | 9/1992 | Venolia | 345/145 |
| 5,179,656 | 1/1993 | Lisle | 395/159 |
| 5,298,890 | 3/1994 | Kanamaru et al. | 345/157 |

FOREIGN PATENT DOCUMENTS

| | | | |
|---|---|---|---|
| 2204783 | 8/1990 | Japan | 345/145 |
| 6289835 | 10/1994 | Japan | 345/157 |

*Primary Examiner*—Mark R. Powell
*Attorney, Agent, or Firm*—Seed and Berry LLP

[57] ABSTRACT

A cursor is displayed with one of several different cursor orientations depending on the current position to which the cursor points on a display screen. The "cursor orientation" refers to the alignment of the cursor relative to an edge of the display screen. When the cursor points to a position that is within a predetermined distance from one of the edges of the display screen, the cursor is not visible on the display screen. Upon detecting that the cursor is not visible on the display screen, the cursor is displayed with a different cursor orientation such that the cursor is visible on the display screen. Preferably, the cursor orientation is selected so that when the cursor is displayed with the new cursor orientation, the entire cursor is visible on the display screen.

26 Claims, 7 Drawing Sheets

DISTANCE CONTROL FOR DISPLAYING A CURSOR

TECHNICAL FIELD

The present invention relates generally to data processing systems and more particularly to the display of cursors in data processing systems.

BACKGROUND OF THE INVENTION

A conventional computer system typically includes a video display with a display screen having a number of discrete positions. Typically a cursor is displayed on the display screen of the video display to point to one of the positions on the display screen. The cursor usually has a hot spot, which indicates the position to which the cursor points, as well as a base, which is the remaining portion of the cursor. The hot spot is usually one pixel in size. Because of the small size of the hot spot, the hot spot is not readily visible on the display screen without the base of the cursor. The hot spot is therefore identified by the base of the cursor, which is typically several pixels in size and more readily seen by a user viewing a display screen. FIG. 1 illustrates an example of a cursor 112 displayed on a display screen 102. The display screen has a number of discrete positions as identified by the illustrated squares. One skilled in the art would recognize that a typical display screen has many more discrete positions than illustrated in FIG. 1. The display screen is bounded by a top edge 104, a bottom edge 106, a right edge 108, and a left edge 110. The cursor 112 is an arrow cursor which has the shape of an arrow. The tip of the arrow is the hot spot 114, and the remaining portion of the arrow is the base 116. The arrow cursor 112 points to position 118, with the hot spot 114 placed directly on position 118.

Often times an input device, such as a mouse, is used to manipulate the location of the cursor on the display screen. When the cursor points to a position near an edge of the display screen, the cursor may be displayed on the display screen such that only the hot spot of the cursor is visible on the display screen, whereas the base of the cursor is not visible on the display screen. Since the base of the cursor typically identifies the location of the hot spot, when only the hot spot is visible on the display screen, it is difficult for a user to see the hot spot and determine the position to which the cursor currently points.

SUMMARY OF THE INVENTION

In accordance with a first aspect of the present invention, a method is practiced in a data processing system having a video display with positions and a plurality of regions. The data processing system also includes a cursor for pointing to a position on the video display and an input device for manipulating the cursor. In addition, each of the regions has edges, and the cursor has a plurality of orientations which identify an alignment of the cursor relative to one of the edges. In accordance with this method, it is first detected that the cursor is pointing to a current position in one of the regions, where the cursor has a current cursor orientation. Then, it is detected that the cursor is pointing to a position in a region different from a previous region to which the cursor was previously pointing. Next, a cursor orientation is determined based on the detected one of the regions wherein the cursor orientation is different from a previous cursor orientation which the cursor had when pointing to a position in the previous region. The cursor is displayed with the determined cursor orientation at the detected position in the detected one of the regions.

In accordance with a second aspect of the present invention, a method is practiced in a data processing system having a video display with positions and a plurality of regions. The data processing system includes a cursor for pointing to the positions and an input device for manipulating the cursor. Furthermore, the cursor has a plurality of orientations and a predetermined number of cursor types, where each of the orientations identifies an alignment of the cursor relative to one of the edges of one of the regions. In accordance with this method, it is first detected that a cursor type has been selected. Upon detecting that a cursor type has been selected, a default cursor is retrieved which has a predetermined one of the cursor types for the detected cursor type. Then, a plurality of cursors are generated using the retrieved default cursor, where each one of the cursors has a different cursor orientation.

In accordance with another aspect of the present invention, a method is practiced in a data processing system having a video display with positions and a region having a plurality of edges. Each of these edges has a plurality of points. Additionally, the data processing system includes a cursor for pointing to a position on the video display, and an input device for manipulating the cursor. The cursor has an orientation which identifies an alignment of the cursor relative to one of the edges of the region. In accordance with this method, it is detected that the cursor is pointing to a position within a predetermined distance from a closest point from one of the edges of the region. A cursor orientation is determined based on the detected one of the edges. Then, the cursor is displayed with the determined cursor orientation.

In accordance with yet another aspect of the present invention, a data processing system includes a video display, positions, and a cursor for pointing to the positions. The cursor has a base and a hot spot which indicate a position to which the cursor points. In accordance with this method, it is detected that a portion of the base of the cursor is not displayed on the video display while the hot spot of the cursor remains displayed on the video display. Then, the base of the cursor is rotated around the hot spot of the cursor so that a predetermined portion of the base of the cursor is displayed on the video display while the hot spot of the cursor remains displayed on the video display.

In accordance with still another aspect of the present invention, a data processing system includes a video display having positions and a plurality of regions, a cursor for pointing to a position in one of the regions, and an input device for manipulating the cursor. The data processing system also includes a first detector for detecting that the cursor is pointing to a position in a current region. The data processing system includes a second detector for detecting that the cursor is pointing to a position in a region different from the current region detected by the first detector. Moreover, the data processing system includes a determinor for determining a cursor orientation based on the region detected by the second detector and a displayor for displaying the cursor with the determined cursor orientation.

In accordance with a further aspect of the present invention, a data processing system includes a video display having a cursor for pointing to a position on the video display. The data processing system also includes a memory for storing a plurality of visual representations for the cursor. Moreover, the data processing system has a receiver for receiving an indication that a user has selected one of the visual representations of the cursor, and a generator for generating additional visual representations of a plurality of orientations of the selected one of the visual representations of the cursor as identified by the indication received by the receiver. In addition, the data processing system includes a storage for storing each of the visual representations generated by the generator in the memory. The data processing system also includes a retriever for retrieving from the storage each of these visual representations for display.

In accordance with still a further aspect of the present invention, a computer-readable storage medium stores an application program. The application program performs the step of detecting a position of a cursor within a region on a video display. Then, it determines an orientation of the cursor based on the detected position in the region. Additionally, it displays the cursor with the determined orientation at the detected position.

DETAILED DESCRIPTION OF THE INVENTION

The preferred embodiment of the present invention displays a cursor with one of several different orientations depending on the current position to which the cursor points on a display screen. That is, the preferred embodiment of the present invention detects whether or not the cursor is visible on the display screen. When the cursor is not visible on the display screen, a user may not be able to determine which position is pointed to by the cursor. Therefore, upon detecting that the cursor is not visible on the display screen, the preferred embodiment of the present invention displays the cursor with a different cursor orientation such that the cursor is visible on the display screen. The "cursor orientation" refers to the alignment of the cursor relative to an edge of the display screen. Moreover, the preferred embodiment of the present invention selects a cursor orientation based upon the position to which the cursor points. In the preferred embodiment, the cursor orientation is selected so that when the cursor is displayed with the new cursor orientation, the entire cursor is visible on the display screen.

The preferred embodiment of the present invention is especially helpful in assisting a child who is learning to use a computer system. In a preferred embodiment, a MICROSOFT EASYBALL mouse is used to place the cursor on the display screen. The MICROSOFT EASYBALL mouse is especially useful for a child to use because it is shaped as a ball and is easy to handle. However, a child often has a difficult time controlling the movement of the mouse when learning to use a computer system. In particular, a child often moves the mouse so that the cursor is placed on the display screen such that the cursor is not visible on the display screen. When the cursor is not visible on the display screen, a child is not able to determine to which position the cursor currently points, and this impairs the child's ability to learn to use a computer system. By always positioning the cursor so that it is visible on the display screen, the preferred embodiment assists a child in learning to use a computer system.

Figure 1:
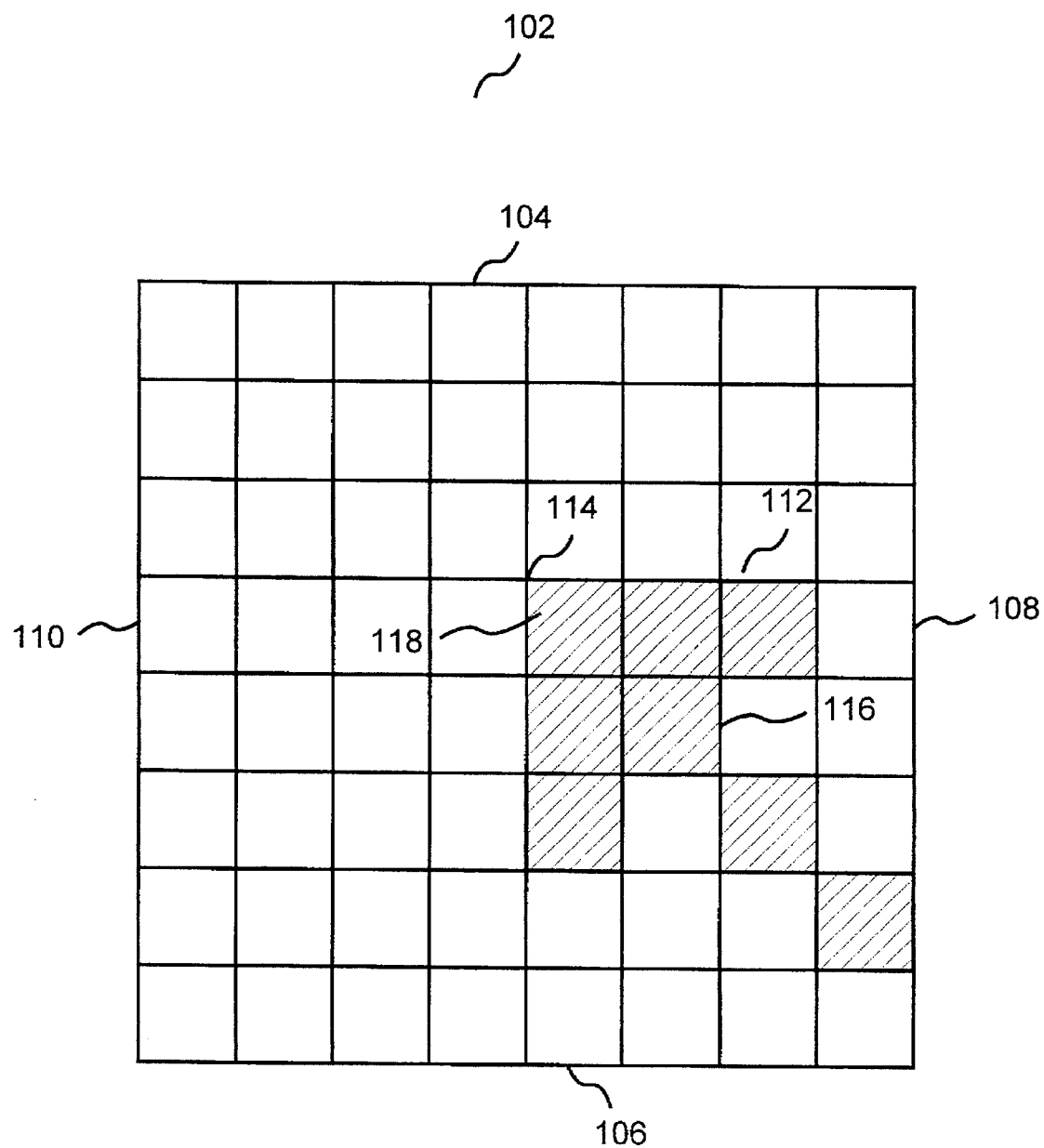
FIG. 1 illustrates an example of a cursor displayed on a display screen.
Figure 2:
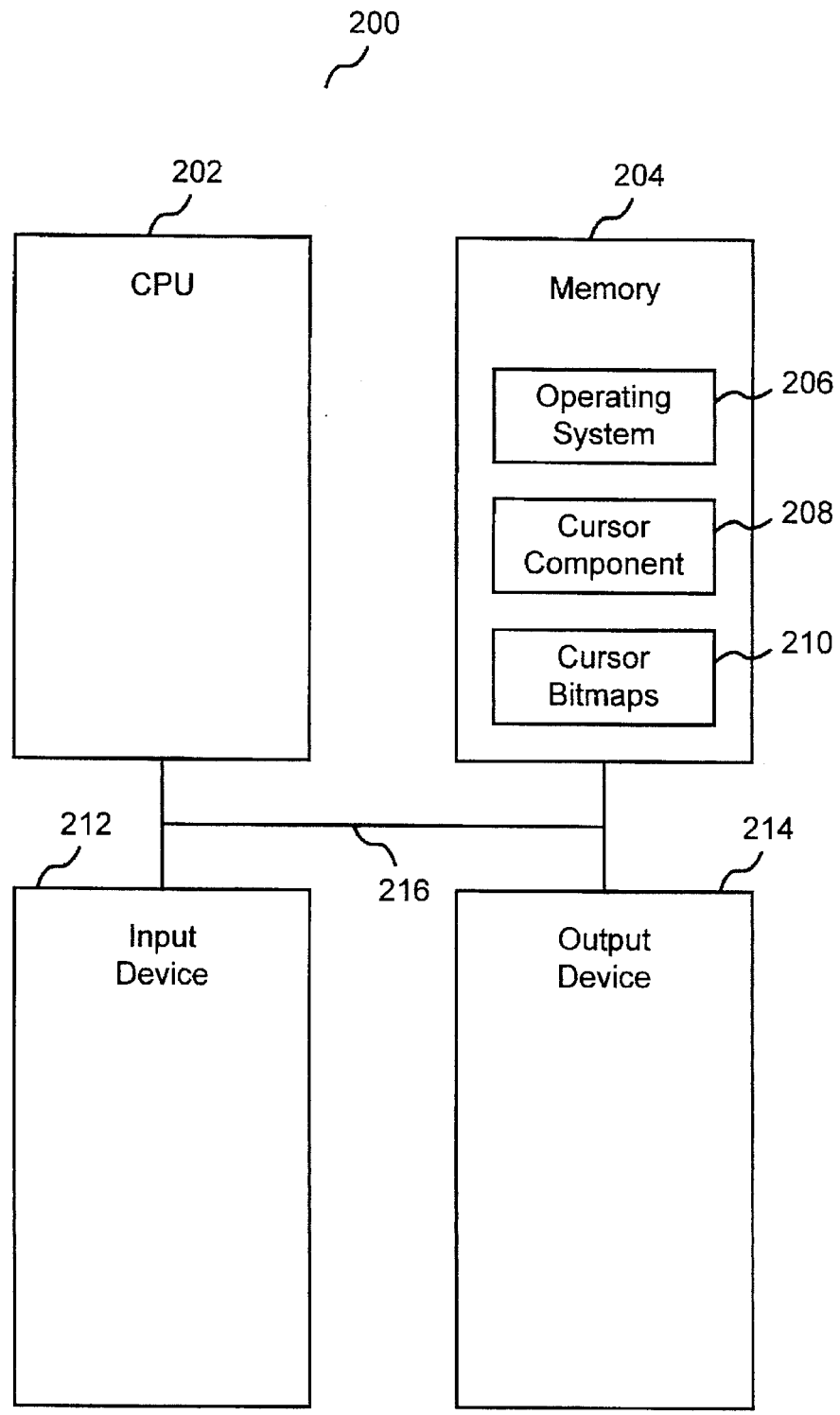
FIG. 2 is a block diagram of a data processing system that is suitable for practicing the preferred embodiment of the present invention.

FIG. 2 is a block diagram of a data processing system 200 that is suitable for practicing the preferred embodiment of the present invention. The data processing system 200 includes at least one central processing unit (CPU) 202. The CPU 202 is connected to a number of peripheral devices, including a memory 204, an input device 212, such as a mouse or keyboard, and an output device 214, such as a video display having a display screen. The memory 204 holds a copy of an operating system 206 such as the Microsoft® Windows®, Version 3.1, operating system, sold by Microsoft Corporation of Redmond, Wash. The memory 204 also holds a cursor component 208 and holds cursor bitmaps 210. The components of the computer system are connected by a connection mechanism 216, such as a bus.

When the user uses an input device, such as the MICROSOFT EASYBALL mouse 212, to move the cursor to point at a position on the video display 214, the operating system 206 determines the (X, Y) coordinates of the position relative to the top, left corner of the display screen and forwards this information in a message to the cursor component 208. The cursor component determines whether the cursor points to a position that is within three pixels of the right edge along a horizontal line corresponding to the X-component of the (X, Y) coordinates or within three pixels of the bottom edge along a vertical line corresponding to the Y-component of the (X, Y) coordinates. When the cursor component determines that the cursor is pointing to a position within three pixels of one of these edges, the cursor component determines that the cursor is only partially visible on the display screen. Then, the cursor component determines that the cursor should be displayed with a different cursor orientation so that the entire cursor is visible on the display screen to ensure that a user can determine the position to which the cursor points. One skilled in the art would recognize that the entire cursor need not be visible, and that, instead, the cursor may be displayed so that only enough of the cursor is visible so as to enable a user to determine the position to which the cursor points.

Figure 3:
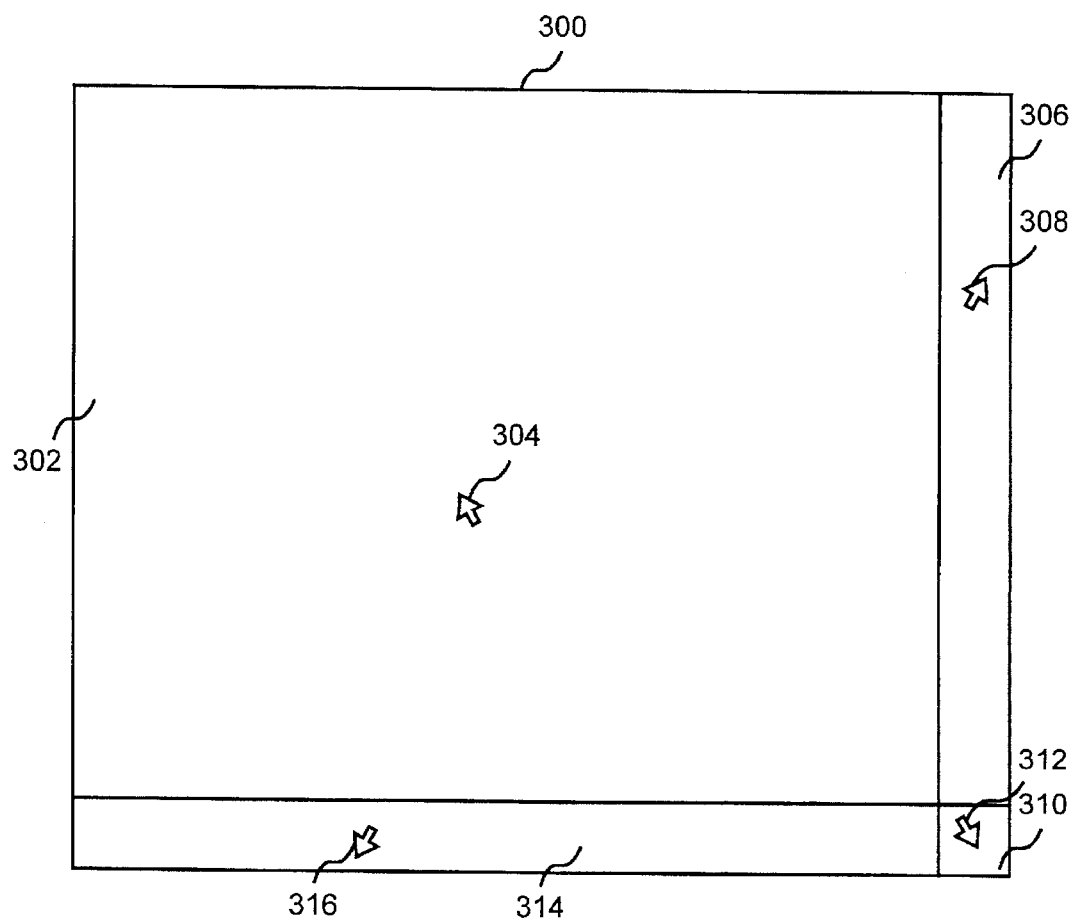
FIG. 3 illustrates a display screen on a video display.

FIG. 3 illustrates a display screen 300 on a video display. The display screen is divided into several regions. Although the regions are bounded by lines in FIG. 3, one skilled in the art would recognize that the present invention may be practiced without the regions being bounded with visible lines. Additionally, one skilled in the art would recognize that the regions are rectangular for illustrative purposes and that the present invention may be practiced with regions which are not rectangular. The regions are the visible region 302, the right edge region 306, the corner region 310, and the bottom edge region 314. When a cursor points to a position in the visible region, the cursor is displayed so that enough of the cursor is visible on the display screen to ensure that a user can determine the position to which the cursor points. In the other three regions, the cursor may point to a position such that the cursor is not visible on the display screen.

Furthermore, a user may determine the size of the regions by setting operating system metrics that are maintained by the operating system 206. The operating system metrics provide information about the size of various graphical items which are provided by the operating system, such as scroll bars. The operating system metrics provide the width of a vertical scroll bar and the height of a horizontal scroll bar. For instance, in the preferred embodiment, the right edge region 306 is the width of a vertical scroll bar which would be displayed at the right edge of the display screen if a scroll bar were needed. Similarly, the bottom edge region 314 is the height of a horizontal scroll bar which would be displayed at the bottom edge if needed. The width of the vertical scroll bar and the height of the horizontal scroll bar of the display screen are retrieved in an operating system metric. Therefore, a user can determine the sizes of the right edge region and the bottom edge region by setting the operating system metrics for the scroll bars. Moreover, the height of a vertical scroll bar and the width of a horizontal scroll bar are typically determined by the height and width of the window in which they are displayed. The corner region 310 is the intersection of the right edge region and the bottom edge region. Additionally, by setting the sizes of the right edge region and the bottom edge region, a user may set the size of the visible region 302.

A cursor may have a fixed number of cursor types which indicate the shape of the cursor. For example, a cursor with an arrow cursor type has the shape of an arrow. In the following discussion, a cursor with an arrow cursor type (i. e., an arrow cursor) will be discussed for illustrative purposes. One skilled in the art would recognize that the present invention may be applied to a cursor with a different cursor type. A cursor may also have different orientations which identify the alignment of the cursor relative to an edge of a region. A default cursor has a predetermined one of these orientations. For example, in FIG. 3, the default cursor 304 is an arrow cursor and is aligned relative to the top and left edges of the visible region 302, with the tip of the arrow directed toward the top, left corner of the visible region 302 in which it is displayed. When this default arrow cursor points to a position in this visible region 302, the entire default arrow cursor 304 is visible on the display screen.

When the arrow cursor 304 is placed to point to a position in a region different from a previous region, the arrow cursor may not be visible. For example, when the arrow cursor is pointing to a position in the visible region and is moved to point to a position in the right edge region, the arrow cursor's orientation may have to change. In particular, as the mouse is used to move the arrow cursor to point to a position within a right edge region 306, at least a portion of the arrow cursor may not be visible on the display screen. In addition, when the arrow cursor is pointing to a position along the right edge of this region 306, only the hot spot of the arrow cursor is visible on the display screen. Because the hot spot is typically only one pixel in size, it is difficult for a user to see. Therefore, upon detecting that the arrow cursor is in the right edge region 306, the cursor component determines that the arrow cursor should have an orientation which places the arrow cursor on the display screen so that it is visible. In particular, the cursor component determines that the arrow cursor 308 in the right edge region 306 should be a right edge cursor, aligned relative to the top and right edges of the region so that the tip of the arrow is directed to the top, right corner.

Similarly, when the mouse is used to move the arrow cursor to the corner region 310 or bottom edge region 314, the arrow cursor may be only partially visible on the display screen. Therefore, when the arrow cursor points to positions in these regions, the cursor component determines different orientations for the arrow cursor so that the cursor is visible on the display screen. For instance, when the arrow cursor points to positions in the corner region 310, the cursor component determines that the arrow cursor 312 should be a corner cursor, oriented so that the tip of the arrow is directed to the bottom, right corner. In addition, when the arrow cursor points to positions in the bottom edge region 314, the cursor component determines that the arrow cursor 312 should be a bottom edge cursor, oriented so that the tip of the arrow is directed to the bottom, left corner.

Figure 4:
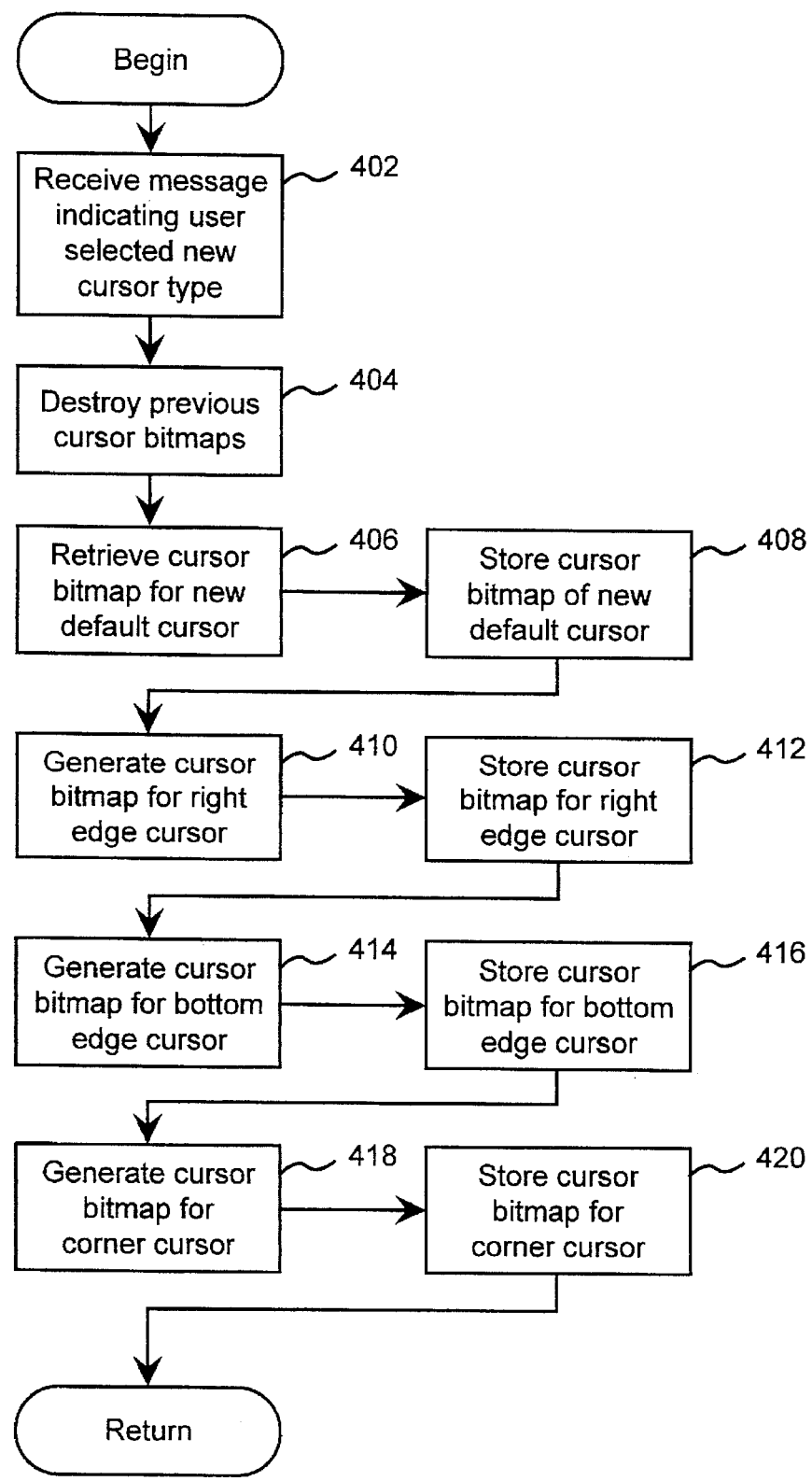
FIG. 4 is a flowchart illustrating the steps performed when a user selects one of the predetermined cursor types.

The steps that are performed when a user selects one of the predetermined number of cursor types are shown in FIG. 4. Initially, the cursor component receives a message indicating that the user has selected a new cursor of a different cursor type from a previously selected cursor type (step 402). In a local memory location that is readily accessible to the cursor component, there are already stored a cursor bitmap for the default cursor of the previously selected cursor type as well as cursor bitmaps for different orientations of this default cursor of the previously selected cursor type. A cursor bitmap is a bitmap in which the bits may not be modified. When a new cursor is selected, these cursor bitmaps are destroyed in the local memory (step 404). Next, the cursor component retrieves the cursor bitmap for the default cursor of the cursor type of the newly selected cursor from a file on a hard disk drive of the data processing system (200) containing the cursor bitmaps for default cursors of a predetermined number of cursor types (step 406). This cursor bitmap for the default cursor is stored in the local memory (step 408). Additionally, in a preferred embodiment, the display screen is rectangular and the cursor may not be completely displayed on the display screen near the right edge of the display screen, near the bottom edge of the display screen, and near the corner at which these edges intersect. Therefore, the cursor component generates three cursor bitmaps having three different orientations for the selected default cursor using the cursor bitmap for the default cursor. One skilled in the art would appreciate that the selection of three orientations does not limit the invention, but is only illustrative. First, the cursor component generates a cursor bitmap for a right edge cursor (step 410), and the cursor bitmap for the right edge cursor is stored in the local memory (step 412). Next, the cursor component generates a cursor bitmap for a bottom edge cursor (step 414), and this is stored in the local memory (step 416). Finally, the cursor component generates a cursor bitmap for a corner cursor (step 418), and this is stored in the local memory (step 420).

Figure 5:
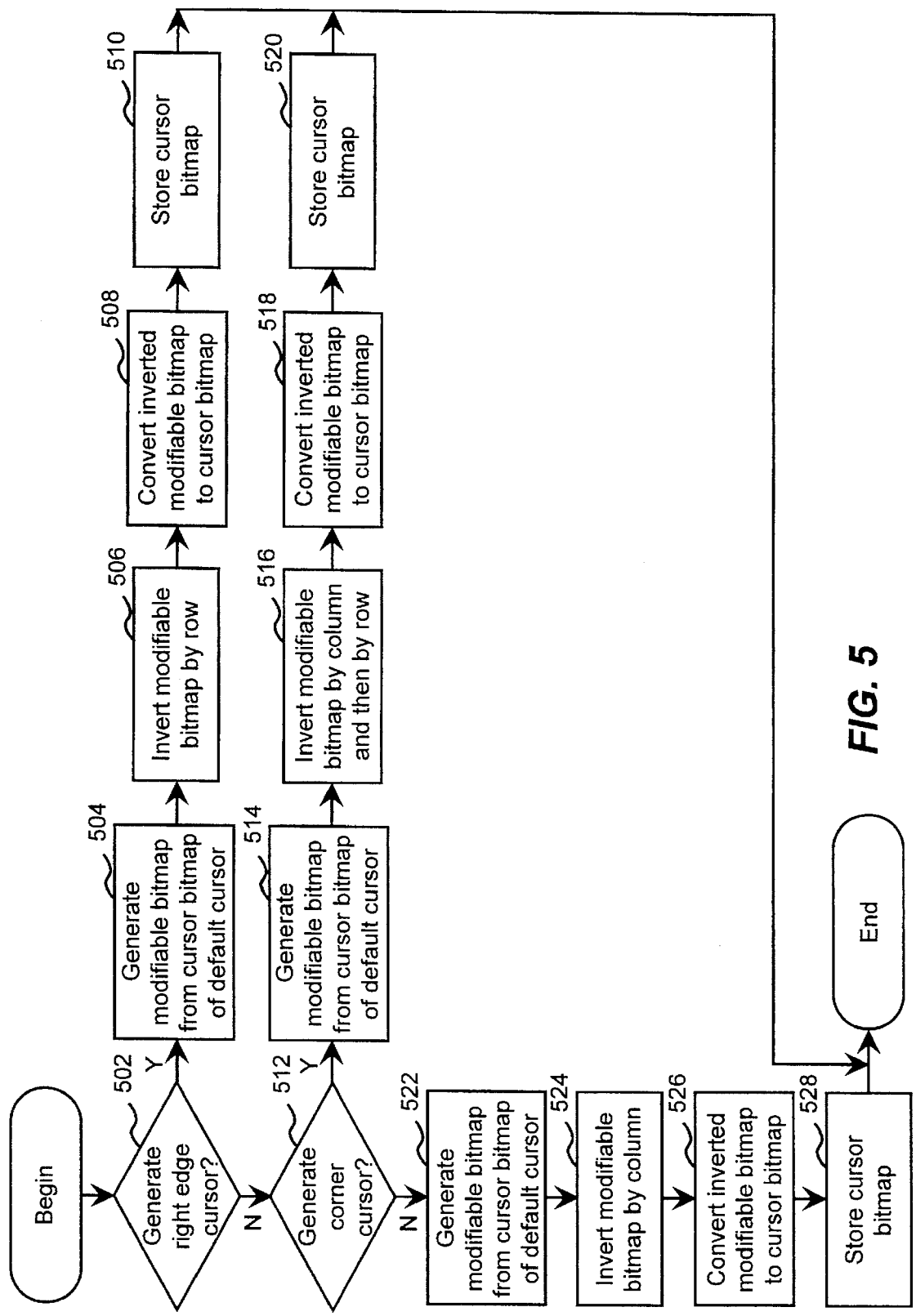
FIG. 5 is a flowchart illustrating the steps performed to generate cursor bitmaps having different orientations using the cursor bitmap for the default cursor.

The steps that are performed to generate the cursor bitmaps with different orientations using the cursor bitmap for the default cursor are described in FIG. 5. The cursors are generated as device independent bitmaps. First, the cursor component determines whether it is generating a right edge cursor (step 502). In order to generate a right edge cursor, the cursor component generates a modifiable bitmap from the cursor bitmap of the default cursor (step 504). A modifiable bitmap is a bitmap in which the bits may be modified. The cursor component inverts the modifiable bitmap by row (step 506). The modifiable bitmap may be represented by a 4×4 table as illustrated below.

|   | 0 | 1 | 2 | 3 |
|---|---|---|---|---|
| 0 | 1 | 1 | 0 | 0 |
| 1 | 1 | 1 | 0 | 0 |
| 2 | 0 | 0 | 1 | 0 |
| 3 | 0 | 0 | 0 | 0 |

One skilled in the art would recognize that a 4×4 table is used for illustration only, and that a larger table may be used to represent a modifiable bitmap. Each entry in the table contains a bit and corresponds to an (X, Y) coordinate relative to the top, left corner of the table. Also, each entry corresponds to a position of one pixel size on a display screen. In the above table, the hot spot is located at the (0, 0) coordinate of the table, and this cursor is an arrow cursor which is aligned relative to the top and left edges of the table. In memory, this table is represented as a series of bits, with the bits of each row ordered sequentially and preceding the bits of a higher row number. For the above table, the representation in memory is:

1100 1100 0010 0000

When generating the cursor bitmap for the right edge cursor, these bits are inverted by row, which results in the following series of bits:

0011 0011 0100 0000

In table form, these bits would be represented as illustrated below.

|   | 0 | 1 | 2 | 3 |
|---|---|---|---|---|
| 0 | 0 | 0 | 1 | 1 |
| 1 | 0 | 0 | 1 | 1 |
| 2 | 0 | 1 | 0 | 0 |
| 3 | 0 | 0 | 0 | 0 |

The hot spot is now located at the (0, 3) coordinate of the table, and the arrow cursor is aligned relative to the top and right edges of the table.

After inverting the bits of the modifiable cursor, the cursor component converts the inverted modifiable bitmap to a cursor bitmap (step 508). Then, the cursor component stores the cursor bitmap for the right edge cursor in the local memory (step 510). When the cursor component is not generating the right edge cursor, the cursor component determines whether it is generating a corner cursor (step 512). In order to generate a corner cursor, the cursor component generates a modifiable bitmap from the cursor bitmap of the default cursor (step 514). Then, the cursor component inverts the modifiable bitmap by column and then inverts this bitmap by row (step 516). The cursor component converts the inverted modifiable bitmap to a cursor bitmap (step 518). Then, the cursor component stores this cursor bitmap for the corner cursor in the local memory (step 520). Otherwise, the cursor component is generating a bottom edge cursor. In order to generate a bottom edge cursor, the cursor component generates a modifiable bitmap from the cursor bitmap of the default cursor (step 522). Then, the cursor component inverts the modifiable bitmap by column (step 524). The cursor component converts the inverted modifiable bitmap to a cursor bitmap (step 526). Then the cursor component stores this cursor bitmap in the local memory (step 528). After these cursor bitmaps are stored in the local memory, when a cursor is moved to point to a position in a region different from previous region, the cursor component determines which cursor to display and retrieves the appropriate cursor bitmap for that cursor from the local memory.

Figure 6:
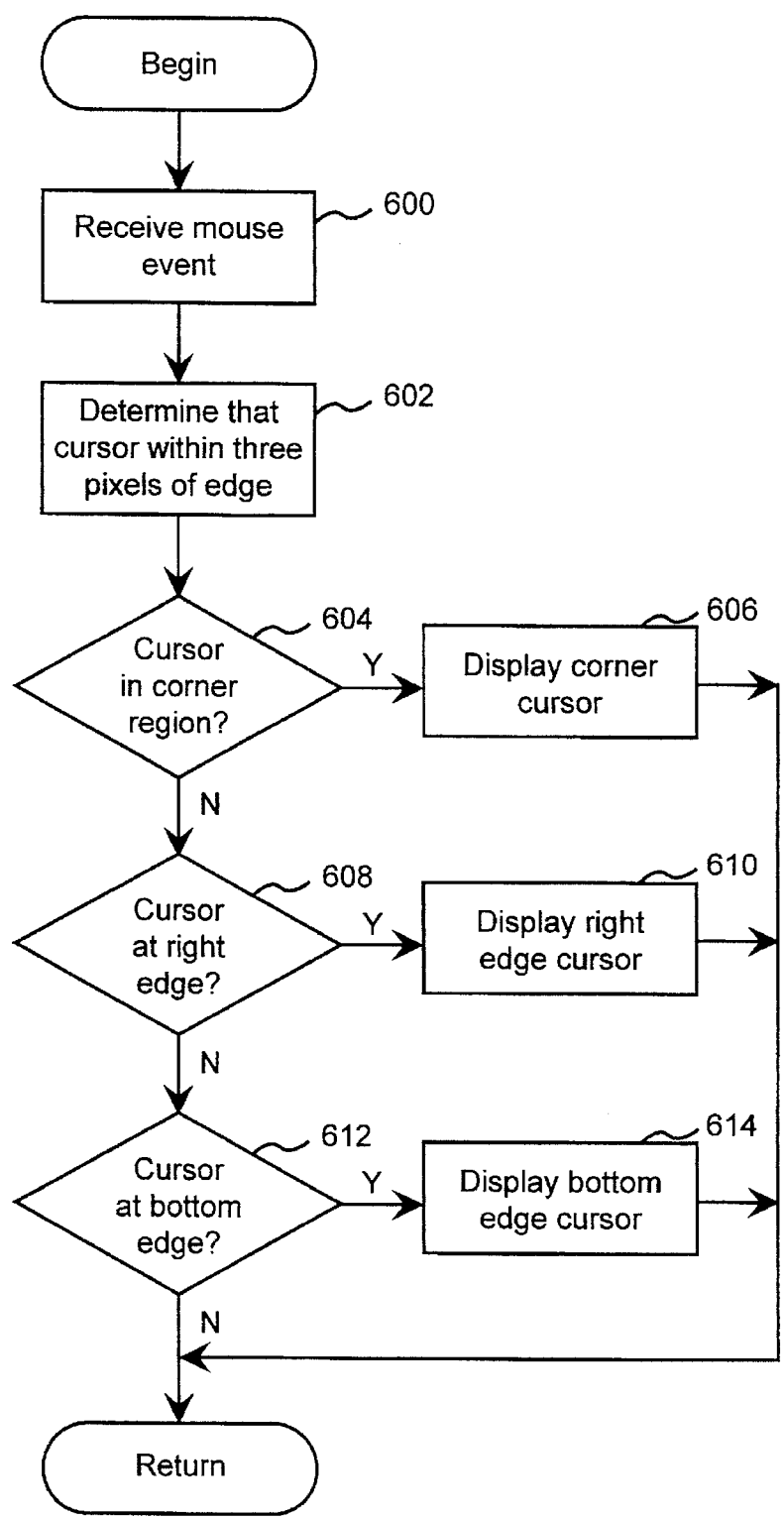
FIG. 6 is a flowchart illustrating the steps performed when the cursor is positioned near an edge of the display screen.

The steps performed when the cursor is positioned near an edge of the display screen are shown in FIG. 6. The cursor component receives a mouse event (step 600) indicating the (X, Y) coordinates of a position on the display screen. Then, the cursor component determines that this position is within three pixels from the right edge of the display screen along a horizontal line corresponding to the X-component of the (X, Y) coordinates or within three pixels from the bottom edge of the display screen (step 602) along a vertical line corresponding to the Y-component of the (X, Y) coordinates. The cursor component then determines whether the cursor is pointing to a position in the bottom, right corner of the display screen (step 604). When the cursor is pointing to a position in the bottom, right corner, the cursor component displays the corner cursor (step 606). If the cursor is not pointing to a position in the bottom, right corner, the cursor component determines whether the cursor is pointing to a position within three pixels from the right edge (step 608). When the cursor is pointing to a position within three pixels from the right edge, the cursor component displays the right edge cursor (step 610). Otherwise, the cursor component determines whether the cursor is pointing to a position within three pixels from the bottom edge (step 612). When the cursor is pointing to a position within three pixels from the bottom edge, the cursor component displays the bottom edge cursor (step 614).

Figure 7:
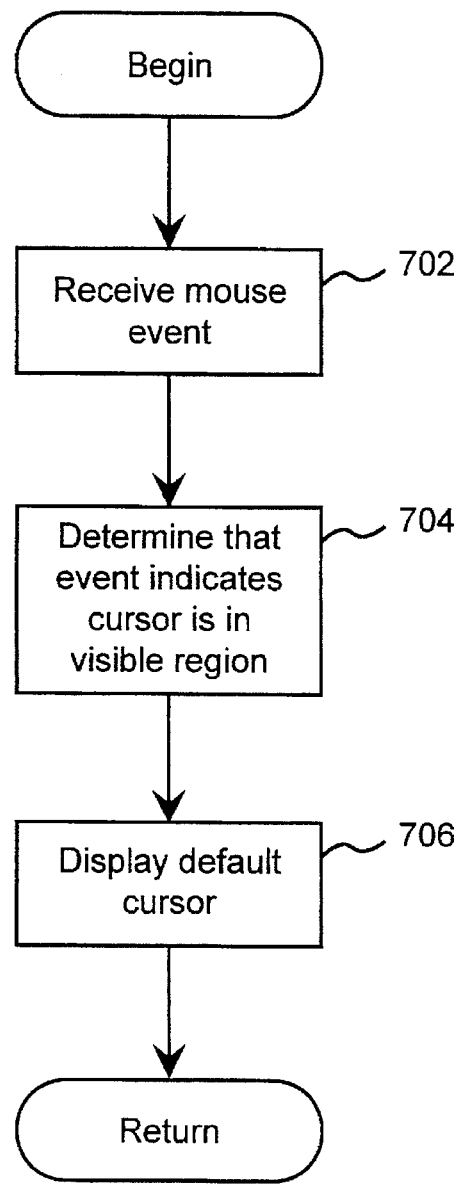
FIG. 7 is a flowchart illustrating the steps performed when the cursor points to a position such that the default cursor is completely visible on the display screen.

The steps that are performed when the cursor points to a position such that the default cursor is completely visible on the display screen are shown in FIG. 7. Initially, the cursor component receives a mouse event (step 702) indicating the (X, Y) coordinates of a position on the display screen. The cursor component then determines that the mouse event indicates that the cursor is pointing to a position in a visible region in which the default cursor may be displayed such that the default cursor is completely visible on the display screen (step 704). This visible region is set off by the top edge of the display screen, the left edge of the display screen, the top edge of the bottom edge region, and the left edge of the right edge region. After detecting that the cursor is pointing to a position in the visible region, the cursor component displays the default cursor (step 706).

As discussed above, a preferred embodiment of the present invention is especially useful in assisting a child to learn to use a computer system. When a child moves the cursor on the display screen so that the cursor is no longer visible on the display screen, the child may become confused and frustrated with using the computer system. Therefore, by ensuring that a cursor is always visible on the display screen, the preferred embodiment assists a child to learn to use a computer system. Moreover, any user may be annoyed when the cursor is not visible on the display screen because this leads to the user moving the mouse to place the cursor to point to a position on the display screen such that the cursor is visible. When a user has to be concerned with "finding" the cursor, the user is interrupted in the use of the computer system. However, with the preferred embodiment, a user may continue with a task without taking time to determine to which position on the display screen the cursor is pointing.

While the present invention has been described with reference to a preferred embodiment thereof, those skilled in the art will appreciate the various changes in form and detail may be made without departing from the intended scope of the present invention as defined in the appended claims. In particular, although the preferred embodiment of the present invention discusses a mouse as a pointing device, those skilled in the art would recognize that other pointing devices may be used. Additionally, although the preferred embodiment discusses a display screen of a video display, other output devices may by used. Moreover, although the preferred embodiment provides an example using an arrow cursor, other cursors may be used. Furthermore, although the preferred embodiment is illustrated with a discussion of a rectangular display screen and rectangular regions, the cursor may be displayed on a display screen having another form, such as a circular form, and the regions may take on other forms, such as triangular forms.

We claim:

1. In a data processing system having a video display with positions and a plurality of regions, a cursor for pointing to a position on the video display, the cursor being an arrow cursor having a base and a hot spot, the hot spot indicating a position to which the cursor points on the video display, and an input device for manipulating the cursor, each of the regions having edges, the cursor having a plurality of orientations which identify an alignment of the cursor relative to one of the edges of one of the regions, a method comprising the computer-implemented steps of:

detecting that the cursor is pointing to a current position in one of the regions, wherein the cursor has a current cursor orientation;

detecting that the cursor is pointing to a position in a region different from a previous region to which the cursor was previously pointing;

determining a cursor orientation based on the detected one of the regions by determining an angle relative to an edge of that region at which to display the base while positioning the hot spot at the position pointed to by the cursor, wherein the cursor orientation is different from a previous cursor orientation which the cursor had when pointing to a position in the previous region; and displaying the cursor with the determined cursor orientation at the detected position in the detected one of the regions.

2. The method of claim 16 wherein the step of detecting that the cursor is pointing to a position in a region different from a previous region to which the cursor was previously pointing further comprises detecting that the cursor is pointing to a position in a partial visibility region in which the hot spot of the cursor is visible on the video display and the base of the cursor is not visible on the video display.

3. The method of claim 2, further comprising:

detecting that the cursor is pointing to a position in one of the regions other than the partial visibility region;

determining a new cursor orientation different from the previous cursor orientation, which the cursor had when pointing to a position in the partial visibility region, based on the detected one of the regions; and displaying the cursor with the determined new cursor orientation at the detected position.

4. In a data processing system having a video display having positions and a plurality of regions, a cursor for pointing to the positions, and an input device for manipulating the cursor, the cursor having a plurality of orientations and a predetermined number of cursor types, each of the orientations identifying an alignment of the cursor relative to one of the edges of one of the regions, a method comprising the computer-implemented steps of:

detecting that a cursor type has been selected;

upon detecting that a cursor type has been selected, retrieving a default cursor which has a predetermined one of the cursor types, for the detected cursor type; and generating a plurality of cursors using the retrieved default cursor, each one of the cursors having a different cursor orientation.

5. The method of claim 4 wherein after the step of generating a plurality of cursors using the retrieved default cursor, further comprising:

detecting a position of the video display pointed to by the cursor; and displaying the default cursor at the detected position of the video display.

6. The method of claim 4 wherein the video display has a plurality of regions and wherein the cursor is pointing to one of the regions, further comprising:

detecting that the cursor is pointing to a region different from a previous region to which the cursor was previously pointing;

determining which of the plurality of generated cursors to display in the detected one of the regions; and displaying the determined one of the cursors in the detected one of the regions.

7. In a data processing system having a video display having positions, a region having a plurality of edges, each of the edges having a plurality of points, a cursor for pointing to a position on the video display, and an input device for manipulating the cursor, the cursor having an orientation which identifies an alignment of the cursor relative to one of the edges of the region, a method comprising the computer-implemented steps of:

detecting that the cursor is pointing to a position within a predetermined distance from a closest point from one of the edges of the region;

determining a cursor orientation based on the detected one of the edges; and displaying the cursor with the determined cursor orientation.

8. The method of claim 7 wherein the region is rectangular and wherein the cursor is an arrow cursor which is displayed initially with a cursor orientation angled relative to the top and left edges of the region, further comprising:

detecting that the cursor is pointing to a position within a predetermined distance from a closest point from one of the edges of the region;

when the cursor is pointing to a position within a predetermined distance from a closest point from a right edge of the region, displaying the arrow cursor so that the arrow cursor is angled relative to a top edge and a right edge of the region;

when the cursor is pointing to a position within a predetermined distance from a closest point from a bottom edge of the region, displaying the arrow cursor so that the arrow cursor is angled relative to a bottom edge and a left edge of the region; and when the cursor is pointing to a position within a predetermined distance from a closest point from a right, bottom corner of the region, displaying the arrow cursor so that the arrow cursor is angled relative to a bottom edge and a right edge of the region.

9. In a data processing system having a video display, positions, and a cursor for pointing to the positions, the cursor having a base and a hot spot which indicates a position to which the cursor points, a method comprising the computer-implemented steps of:

detecting that a portion of the base of the cursor is not displayed on the video display while the hot spot of the cursor remains displayed on the video display; and rotating the base of the cursor around the hot spot of the cursor so that a predetermined portion of the base of the cursor is displayed on the video display while the hot spot of the cursor remains displayed on the video display.

10. The method of claim 9 wherein the cursor is an arrow cursor and wherein the step of rotating the base of the cursor around the hot spot of the cursor so that a predetermined portion of the base of the cursor is displayed on the video display while the hot spot of the cursor remains displayed on the video display further comprises rotating the base of the cursor without moving the hot spot of the cursor.

11. A data processing system comprising:

a video display having positions and a plurality of regions;

a cursor for pointing to a position on the video display, the cursor having a base and a hot spot that indicates the position to which the cursor points;

an input device for manipulating the cursor;

a first detector for detecting that the cursor is pointing to a position in a current region;

a second detector for detecting that the cursor is pointing to a position in a region different from the current region detected by the first detector;

a determinor for determining a cursor orientation based on the region detected by the second detector by determining an angle relative to an edge of that region at which to display the base while positioning the hot spot at the position pointed to by the cursor; and a displayor for displaying the cursor with the determined cursor orientation.

12. A data processing system comprising:

a video display having a cursor for pointing to a position on the video display;

a memory for storing a plurality of visual representations for the cursor;

a receiver for receiving an indication that a user has selected one of the visual representations of the cursor;

a generator for generating additional visual representations for a plurality of orientations of the selected one of the visual representations of the cursor as identified by the indication received by the receiver;

a storage for storing each of the visual representations generated by the generator in the memory; and a retriever for retrieving from the storage each of these visual representations for display.

13. The system of claim 12 wherein each of the visual representations is a bitmap and wherein the generator for generating additional visual representations further comprises:

a selector for determining a pattern for inverting the bits of each of the bitmaps to generate a plurality of orientations; and an invertor for inverting the bits of each of the bitmaps in memory based on the pattern determined by the selector.

14. A data processing system comprising:

a video display having positions and a plurality of regions, each of the regions have a plurality of edges;

a cursor for pointing to the positions, the cursor having a plurality of orientations and a predetermined number of cursor types, each of the orientations identifying an alignment of the cursor relative to one of the edges of one of the regions;

an input device for manipulating the cursor;

a detector for detecting that a cursor type has been selected;

a retrievor for retrieving a default cursor which has a predetermined one of the cursor types, for the cursor type detected by the detector; and a generator for generating a plurality of cursors using the retrieved default cursor, each one of the cursors having a different cursor orientation.

15. The system of claim 14 wherein the detector is a first detector and wherein generator generates a plurality of cursors using the retrieved default cursor, further comprising:

a second detector for detecting a position of the video display pointed to by the cursor; and a displayor for displaying the default cursor at the position of the video display detected by the second detector.

16. A data processing system comprising:

a video display having positions and a region having a plurality of edges, each of the edges having a plurality of positions;

a cursor for pointing to a position on the video display, the cursor having an orientation which identifies an alignment of the cursor relative to one of the edges of the region;

an input device for manipulating the cursor;

a first detector for detecting that the cursor is pointing to a position within a predetermined distance from a closest point from one of the edges of the region;

a second detector for determining a cursor orientation based on the detected one of the edges; and a displayor for displaying the cursor with the determined cursor orientation.

17. The system of claim 16 wherein the region is rectangular, wherein the cursor is an arrow cursor which is displayed initially with a cursor orientation angled relative to the top and left edges of the region, and wherein the displayor is the first displayor, further comprising:

a third detector for detecting that the cursor is pointing to a position within a predetermined distance from a closest point from one of the edges of the region;

a second displayor for displaying the arrow cursor so that the arrow cursor is angled relative to a top edge and a right edge of the region when the cursor is pointing to a position within a predetermined distance from a closest point from a right edge of the region;

a third displayor for displaying the arrow cursor so that the arrow cursor is angled relative to a bottom edge and a left edge of the region when the cursor is pointing to a position within a predetermined distance from a closest point from a bottom edge of the region; and a fourth displayor for displaying the arrow cursor so that the arrow cursor is angled relative to a bottom edge and a right edge of the region when the cursor is pointing to a position within a predetermined distance from a closest point from a right, bottom corner of the region.

18. A data processing system comprising:

a video display having positions;

a cursor for pointing to the positions, the cursor having a base and a hot spot which indicates a position to which the cursor points;

a detector for detecting that a portion of the base of the cursor is not displayed on the video display while the hot spot of the cursor remains displayed on the video display; and a rotator for rotating the base of the cursor around the hot spot of the cursor so that a predetermined portion of the base of the cursor is displayed on the video display while the hot spot of the cursor remains displayed on the video display.

19. The system of claim 18 wherein the cursor is an arrow cursor and wherein the rotator for rotating the base of the cursor around the hot spot of the cursor so that a predetermined portion of the base of the cursor is displayed on the video display while the hot spot of the cursor remains displayed on the video display further comprises rotating the base of the cursor without moving the hot spot of the cursor.

20. A computer-readable storage medium containing instructions that cause a computer system to:

detect that a cursor type for a cursor has been selected, the cursor for pointing to positions within regions on a video display, the cursor having a plurality of orientations and a predetermined number of cursor types, each of the orientations identifying an alignment of the cursor relative to one of the edges of one of the regions;

retrieve a default cursor which has a predetermined one of the cursor types, for the detected cursor type; and generate a plurality of cursors using the retrieved default cursor, each one of the cursors having a different cursor orientation.

21. The computer-readable storage medium of claim 20 wherein after the instructions cause the computer system to generate a plurality of cursors using the retrieved default cursor, the instructions cause the computer system to:

detect a position of the video display pointed to by the cursor; and display the default cursor at the detected position of the video display.

22. The computer-readable storage medium of claim 20 wherein the instructions cause the computer system to:

detect that the cursor is pointing to a region different from a previous region to which the cursor was previously pointing;

determine which of the plurality of generated cursors to display in the detected one of the regions; and display the determined one of the cursors in the detected one of the regions.

23. A computer-readable storage medium containing instructions that cause a computer system to:

detect that a cursor is pointing to a position within a predetermined distance from a closest point from one of the edges of a region of a video display, the cursor having a cursor orientation which identifies an alignment of the cursor relative to one of the edges of the region;

determine a cursor orientation based on the detected one of the edges; and display the cursor with the determined cursor orientation.

24. The computer-storage medium of claim 23 wherein the region is rectangular and wherein the cursor is an arrow cursor which is displayed initially with a cursor orientation angled relative to the top and left edges of the region, and wherein the instructions cause the computer system to:

detect that the cursor is pointing to a position within a predetermined distance from a closest point from one of the edges of the region;

display the arrow cursor so that the arrow cursor is angled relative to a top edge and a right edge of the region when the cursor is pointing to a position within a predetermined distance from a closest point from a right edge of the region;

display the arrow cursor so that the arrow cursor is angled relative to a bottom edge and a left edge of the region when the cursor is pointing to a position within a predetermined distance from a closest point from a bottom edge of the region; and display the arrow cursor so that the arrow cursor is angled relative to a bottom edge and a right edge of the region when the cursor is pointing to a position within a predetermined distance from a closest point from a right bottom corner of the region.

25. A computer-readable storage medium containing instructions that cause a computer system to:

detect that a portion of a base of a cursor is not displayed on a video display while a hot spot of the cursor remains displayed on the video display, the cursor comprising the base and the hot spot, the video display having positions, the cursor for pointing to positions on the video display, the hot spot indicating a position to which the cursor points; and rotate the base of the cursor around the hot spot of the cursor so that a predetermined portion of the base of the cursor is displayed on the video display while the hot spot of the cursor remains displayed on the video display.

26. The computer-readable storage medium of claim 25 wherein the cursor is an arrow cursor and wherein the instructions that cause the computer system to rotate the base of the cursor around the hot spot of the cursor so that a predetermined portion of the base of the cursor is displayed on the video display while the hot spot of the cursor remains displayed on the video display further cause the computer system to rotate the base of the cursor without moving the hot spot of the cursor.

* * * * *